US005818993A

United States Patent [19]

Chudoba et al.

[11] Patent Number: 5,818,993

[45] Date of Patent: Oct. 6, 1998

[54] METHOD OF POSITIONING AND RELEASABLY LOCKING AN OPTICAL FIBER IN A FIXED POSITION

[75] Inventors: Paul Chudoba, Shohola; Jerome Polizzi, Morrisville, both of Pa.

[73] Assignee: NuVisions International, Inc., Shohola, Pa.

[21] Appl. No.: 746,376

[22] Filed: Nov. 8, 1996

Related U.S. Application Data

[63] Continuation-in-part of Ser. No. 451,484, May 26, 1995, Pat. No. 5,574,813.

[51] Int. Cl.[6] .......... G02B 6/36

[52] U.S. Cl. .......... 385/81; 385/76; 385/77

[58] Field of Search .......... 385/76–87

[56] References Cited

U.S. PATENT DOCUMENTS 5,265,183 11/1993 Feng et al. .......... 385/81

5,574,813 11/1996 Chudoba et al. .......... 385/81

*Primary Examiner*—Phan T. H. Palmer

*Attorney, Agent, or Firm*—Charles S. McGuire; George R. McGuire

[57] ABSTRACT

A bare fiber adapter for holding an end portion of an optical fiber in a predetermined position. A pair of gripper members are pivotally attached to a support member for relative movement to engage and disengage the fiber between opposed gripping surfaces. An axial ferrule fiber optic connector is attached to the support member which is adapted to accept any of a plurality of industry-standard styles of such connectors. A locking member in the nature of a hollow sleeve is movable with respect to the support and gripping members to releasably lock the latter in the fiber-engaging position.

34 Claims, 4 Drawing Sheets

METHOD OF POSITIONING AND RELEASABLY LOCKING AN OPTICAL FIBER IN A FIXED POSITION

REFERENCE TO RELATED APPLICATION

The present application is a continuation-in-part of application Ser. No. 08/451,484, filed May 26, 1995, now U.S. Pat. No. 5,574,813.

BACKGROUND OF THE INVENTION

The present invention relates to optical fiber technology and, more particularly, to a device for holding and connecting the terminal end of an optical fiber in a predetermined location with respect to a connector module, test equipment, or the like; the invention also relates to a novel method of positioning and releasably holding an end portion of an optical fiber in a predetermined position.

The above-referenced application and patent, which are incorporated herein by reference, discuss generally the structure and use of optical fiber devices known as bare fiber adapters. A preferred, novel form of bare fiber adapter is disclosed in conjunction with a fixture which provides a positive stop for positioning the cleaved end of the fiber in a precisely defined plane with respect to the adapter. The end portion of the fiber is held between opposing, resilient surfaces of a pair of gripper members which are pivotally attached to ones another and spring biased toward a closed position wherein the resilient surfaces are in mutual engagement.

The present application discloses additional embodiments of bare fiber adapters, suitable for use in conjunction with the same fiber stop fixture as that disclosed in the referenced patent. In the embodiments disclosed herein, means are provided for releasably locking the gripper member in the closed position, whereby the adapter is better suited than the spring-biased version for use in applications requiring a more permanent connection. Consequently, the method of using the adapters of the present application includes the step of releasably locking the gripping members in the closed position. In addition, the bare fiber adapter of the present invention is compatible with all industry-standard styles of fiber optic modules.

SUMMARY OF THE INVENTION

As in the referenced patent, the bare fiber adapter of the present invention includes a pair of foam rubber pads mounted upon respective members which are mounted for relative pivotal movement to place opposing surfaces of the pads in and out of mutual engagement. With the pad surfaces separated, an end portion of an optical fiber is advanced into a passageway until the fiber terminal end engages a stop. The pivotally mounted members are then moved to bring the opposing surfaces of the pads into mutual engagement with the fiber held firmly between these surfaces.

In the adapter of the present application, means are provided for locking the pivotally mounted members in the closed position with the opposing pad surfaces gripping the fiber. In the disclosed embodiments a pair of gripper members, each carrying a foam pad, are individually mounted upon a support member for pivotal movement about spaced, parallel axes. The passageway for the fiber extends through the support member which is surrounded by a locking member in the form of a hollow sleeve.

In the embodiment the support member and sleeve are cylindrical, the gripper members are semi-cylindrical and the sleeve is movable both rotationally and axially with respect to the support member and gripper member. The sleeve can be moved to the locking position only when the gripper/members are closed, i.e., when the pads are mutually engaged. When in the locked position, an end portion of the sleeve surrounds portions of the gripper members at the ends adjacent the pivotal mountings thereof to prevent movement of the gripper members away from the fiber-engaging position until the sleeve is moved to the unlocking position.

The foregoing and other features of the structure and method of operation of the invention will be more fully understood and fully appreciated from the following detailed disclosure, taken in conjunction with the accompanying drawings.

DETAILED DESCRIPTION

Figure 1:
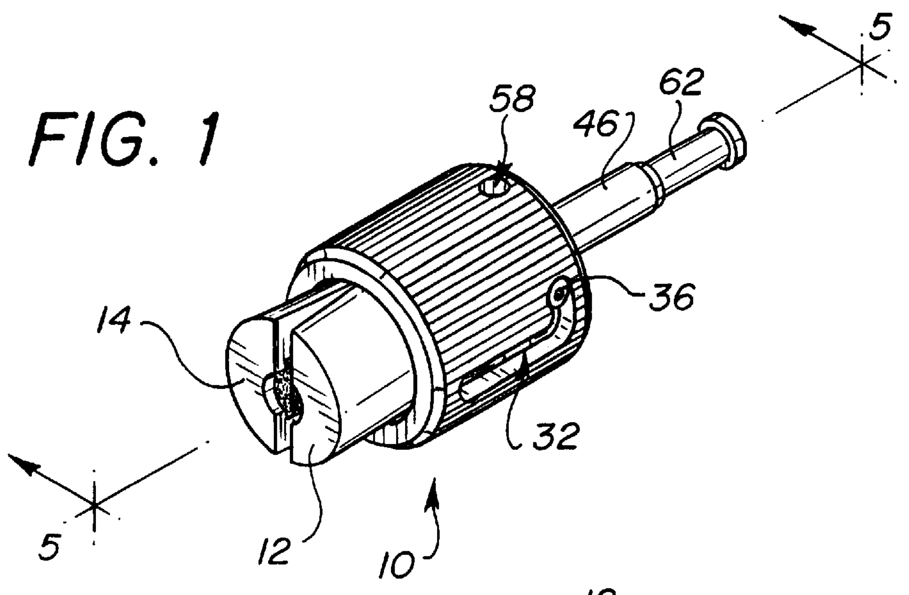
FIG. 1 is a perspective view of the adapter of the invention, as seen from a first end, with certain elements in first positions relative to one another.

In FIGS. 1–8 is shown a first embodiment of the adapter of the invention, denoted generally by reference numeral 10. Adapter 10 includes a pair of gripper members 12 and 14 which carry resold, foam pads 16 and 18, respectively. Gripper members 12 and 14 are individually mounted, by pins 20 and 22, respectively, upon rectangular portion 24, which integrally joins and extends axially from cylindrical portion 26, of support member 28. Gripper members 12 and 14 are pivotally movable about pins 20 and 22 between a first position shown in FIGS. 1 and 2, wherein opposing surfaces of pads 16 and 18 are in mutual contact, and a second position, shown in FIG. 3, wherein the pads are separated.

Figure 5:
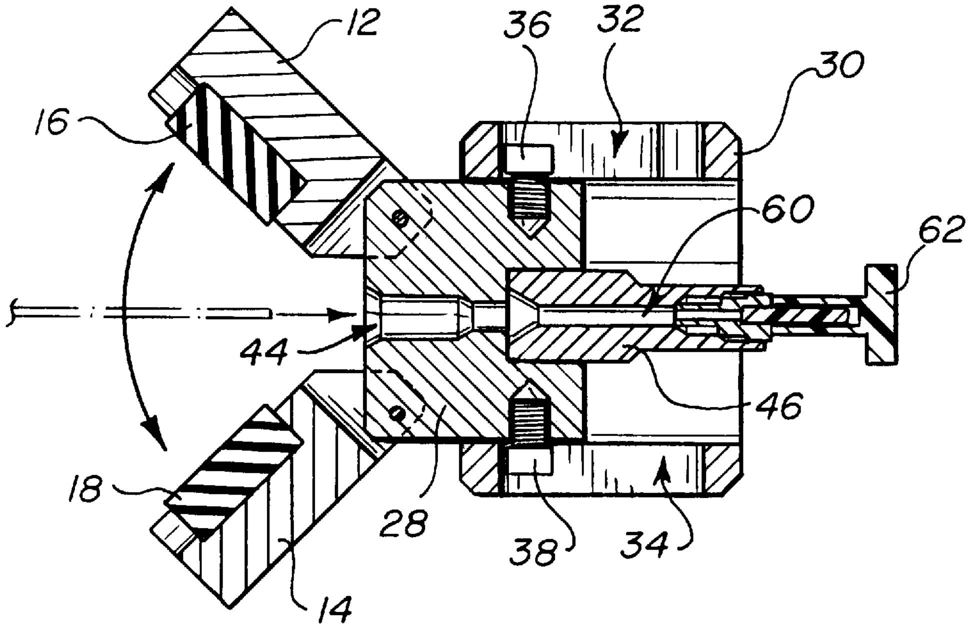
FIGS. 5–8 are elevational views in section of the line 5–5 of FIG. 1, showing various elements in different relative positions and other elements coupled to the adapter in a sequence illustrative of the manner of use of the adapter.
Figure 6:
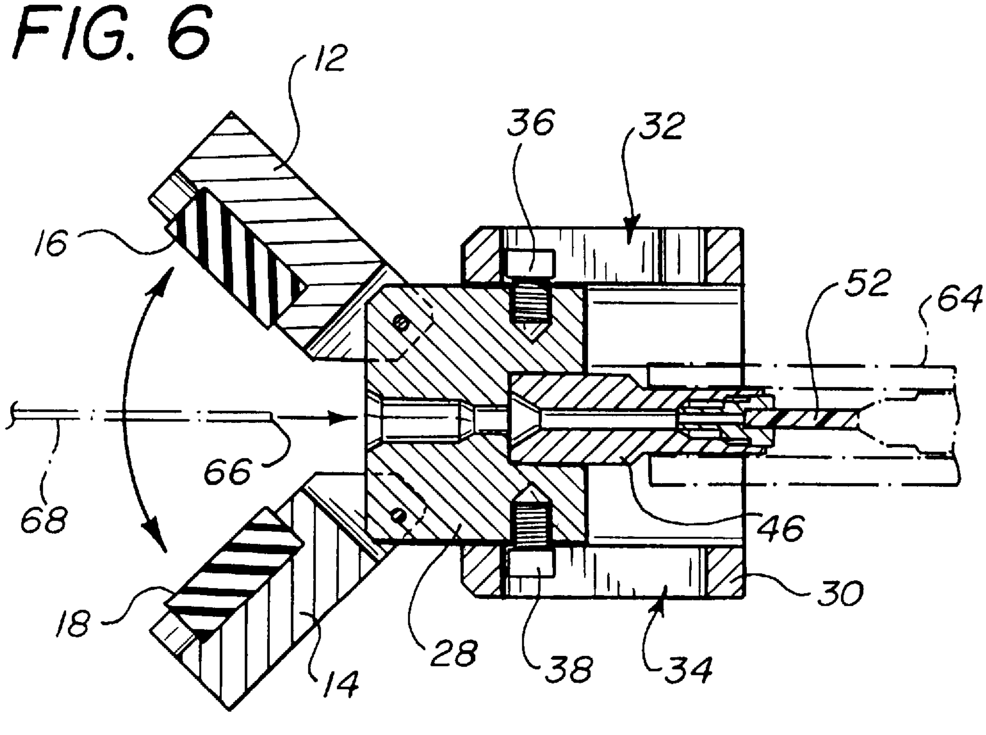
Figure 7:
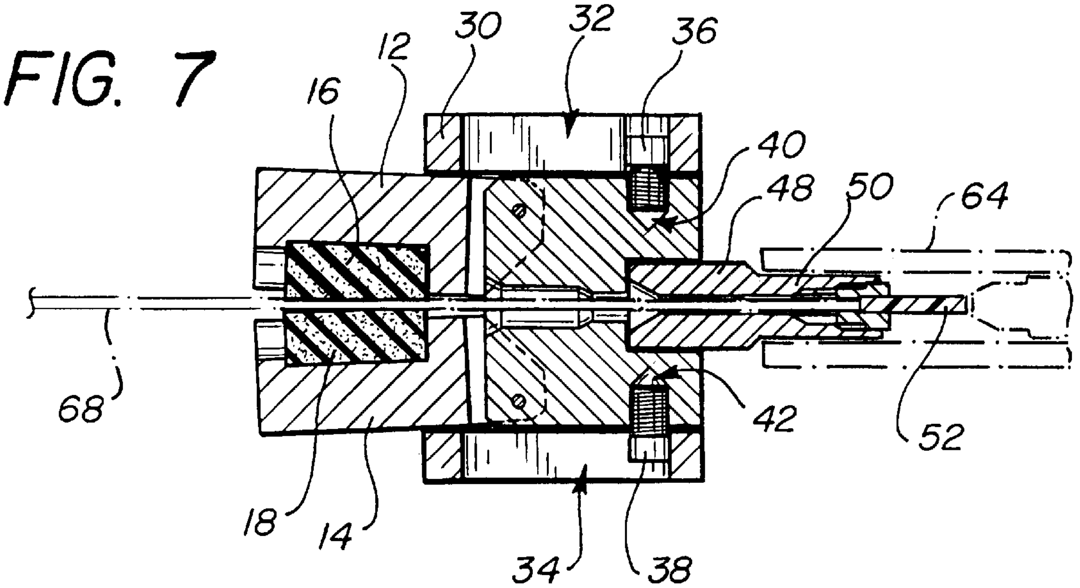

Adapter 10 further comprises locking member 30, in the form of a hollow cylindrical sleeve having an inside diameter slightly larger than the diameter of cylindrical portion 26 of support member 28. Substantially L-shaped slots 32 and 34 extend through locking member 30 on opposite sides thereof. Threaded pins 36 and 38 are engaged in tapped openings 40 and 42, respectively, in opposite sides of support member 28 with the heads of the pins remaining in slots 32 and 34, respectively, as seen in FIGS. 5 and 6. Thus, locking member 30 may be moved axially with respect to gripper members 12 and 14 and support member 28 between forward and rearward limits defined by contact of opposite ends of the axial portions of slots 32 and 34 with the heads of pins 36 and 38.

Figure 2:
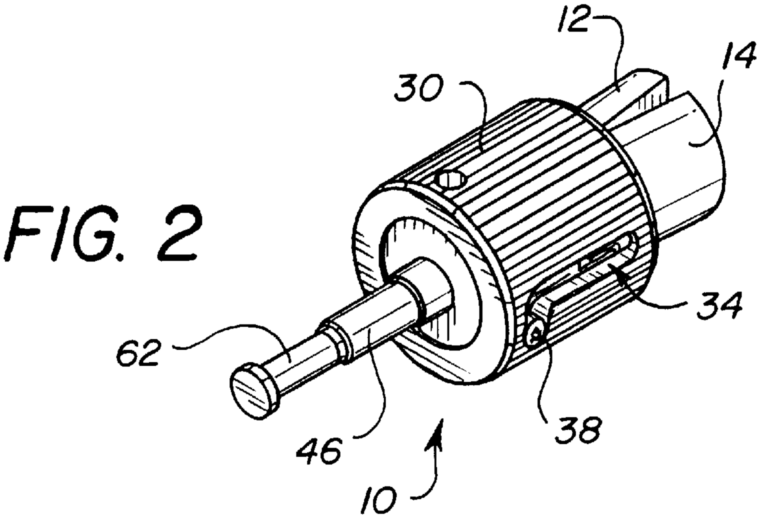
FIG. 2 is a perspective view of the adapter of FIG. 1 as seen from the opposite end, with the elements in their first relative positions.
Figure 3:
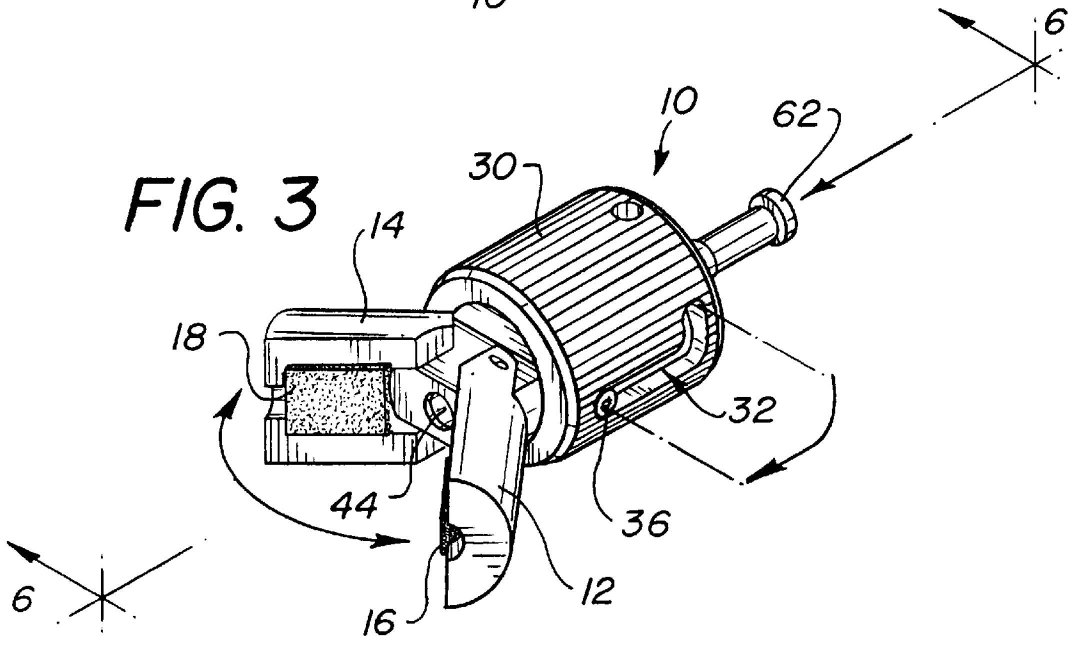
FIG. 3 is a perspective view from the same end as in FIG. 1, with the elements in second relative positions.
Figure 4:
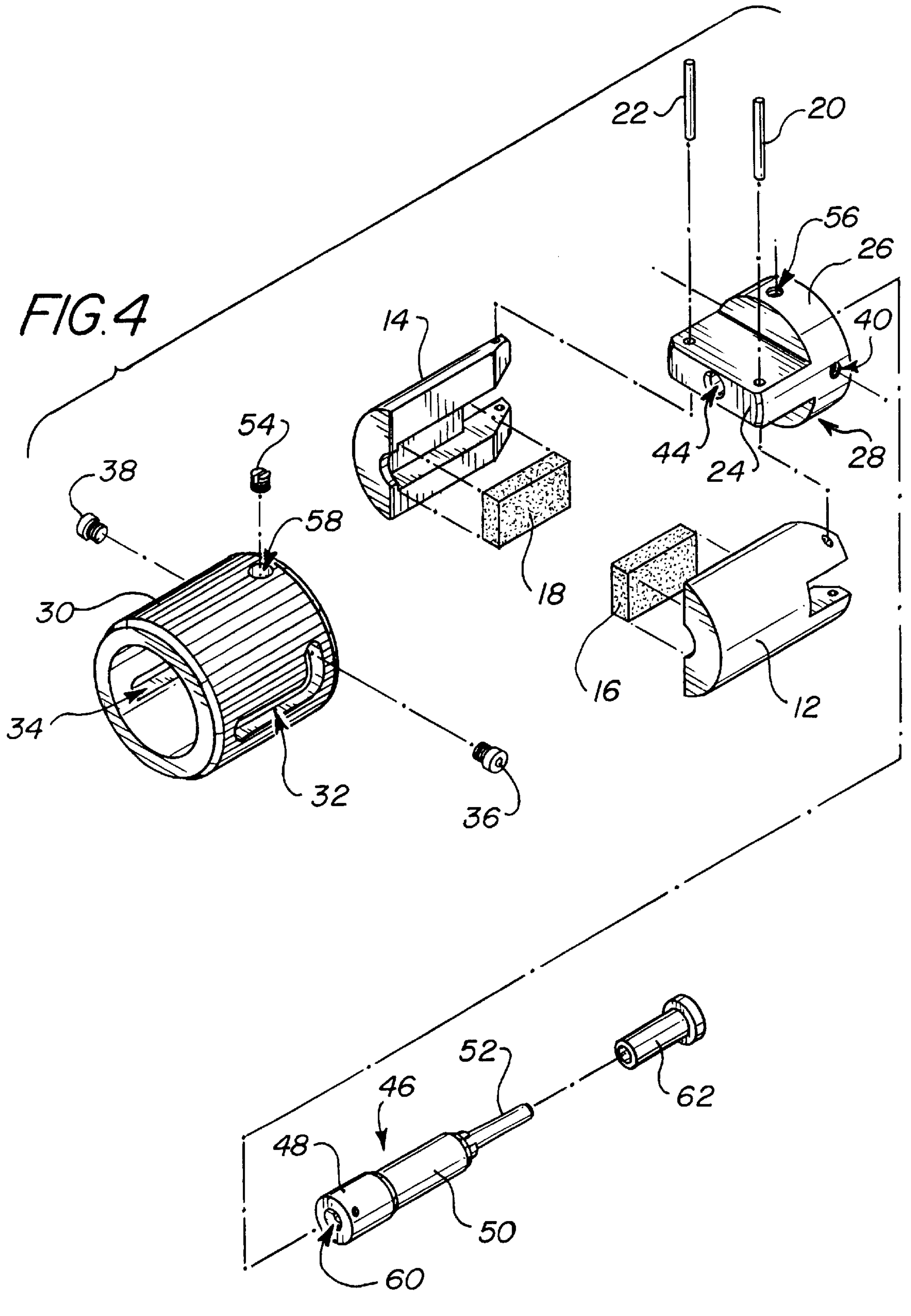
FIG. 4 is an exploded perspective of the adapter of FIGS. 1–3.

When locking member 30 is in its forward portions, i.e., the position in which it is shown in FIG. 3, gripper members 12 and 14 may be moved about their pivotal mountings between positions wherein opposing surfaces of pads 16 and 18 are separated, as in FIG. 3, or are in mutual contact, as in FIGS. 1 and 2. When locking member 30 is in its rearward position, portions of gripper members 12 and 14 adjacent the pivoted ends thereof are surrounded by one end of locking member 30 and are thus prevented from moving away from this position. Also, when in its rearward position, locking member 30 may be rotated through a limited amount of angular movement with respect to support member 28 to place the heads of pins 36 and 38 at the ends of the circumferential portions of L-shaped slots 32 and 34, as shown in FIGS. 1 and 2. In this position, pads 16 and 18 are somewhat compressed and, due to their resilient nature, bias gripper members 12 and 14 outwardly into firm contact with locking member 30. Gripper members 12 and 14 are semi-cylindrical so that their combined, external surfaces form essentially a cylinder for engagement by the inside surface of locking member 30.

Open passageway 44 extends axially through support member 28. Connector module 46 includes a stainless steel barrel having relatively large and intermediate diameter portions 48 and 50, respectively, and relatively smaller diameter zirconium ferrule 52 extending axially from portion 50. Barrel portion 48 is inserted in the larger diameter end of passageway 44 and connector module 46 is secured in place by set screw 54 in threaded opening 56 in support member 28; set screw 54 may be tightened and loosened by a tool extending through opening 58 in locking member 30 when the latter is in its forward position. Axial passageway 60 extends through barrel portions 38 and 50 and ferrule 52, and is in alignment with support members passageway 44. Dust cap 62 is placed over the open end of ferrule 52 when module 46 is not in use.

Referring now to FIGS. 5–8, the sequence of steps in an example of practical employment of adapter 10 will be explained. In FIG. 5, adapter 10 is shown with locking member 30 in its forward position, gripping members 12 and 14 pivoted outwardly to separate pads 16 and 18, and connector module 46 installed with dust cap 62 in place. The elements of adapter 10 are shown in FIG. 6 in the same positions as in FIG. 5; dust cap 62 has been removed and replaced by fixture 64 providing a stop surface for terminal end 66 of optical fiber 68 which is shown entering passageway 44. Although only a fragment of fixture 64 is shown in FIG. 6, such fixtures are fully disclosed and claimed in U.S. Pat. No. 5,574,813 referenced earlier herein.

Figure 8:
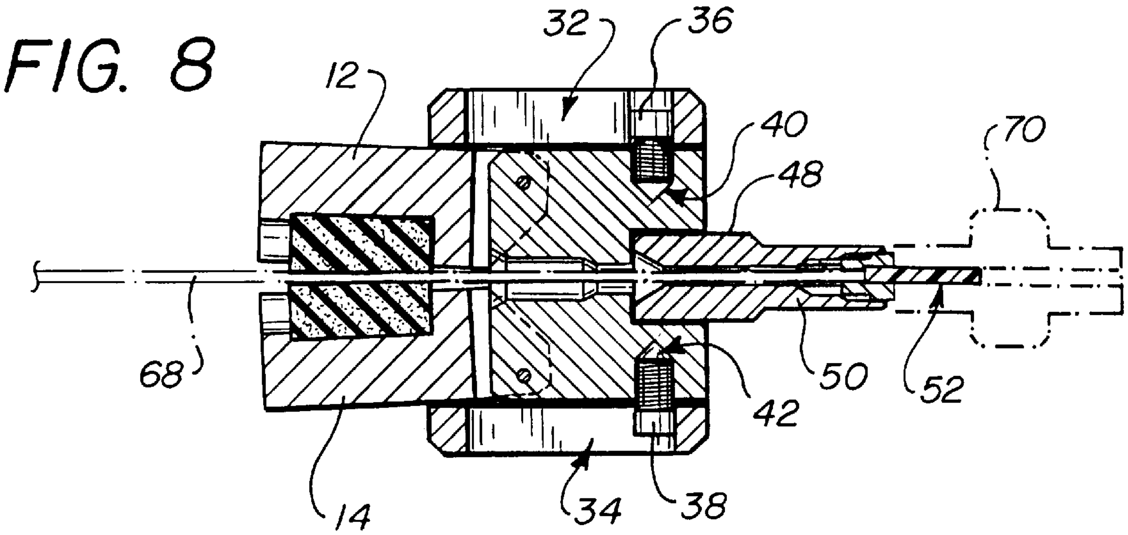

After fiber 68 has been inserted through passageways 44 and 60 until terminal end 66 engages the stop surface of fixture 64, gripper members 12 and 14 are pivoted to bring the opposing surfaces of pads 16 and 18 into mutual engagement, whereby fiber 68 is firmly engaged between the pads. Locking member 30 is moved axially from its forward to its rearward position and rotated to place the elements in their positions of FIG. 7. With fiber 68 clamped and gripper members 12 and 14 locked, fixture 64 is removed from engagement with connector module 46 and replaced by mating sleeve 70, as shown in FIG. 8. Mating sleeve 70 is the subject of copending application Ser. No. 08/714,797, and, as explained therein, may be used to couple any standard style of fiber optic connector to connector module 46 (which may also be any standard style of connector).

What is claimed is:

1. A bare fiber adapter for engaging an end portion of an optical fiber, said adapter comprising:

a) a support member having a passageway extending along a linear axis between first and second ends;

b) gripping means including at least two gripping surfaces;

c) means permitting selective movement of said gripping surfaces relative to one another between first and second positions wherein a fiber extending into said first end of said passageway is engaged and disengaged, respectively, by said gripping surfaces; and d) means for releasably locking said gripping means to retain said gripping surfaces in said first position.

2. The adapter of claim 1 wherein said locking means comprises a locking member selectively movable to and from a locked position with respect to said gripping means when said gripping surfaces are in said first position.

3. The adapter of claim 2 wherein said locking member is in the form of a hollow sleeve.

4. The adapter of claim 3 wherein said sleeve surrounds at least a portion of said support member.

5. The adapter of claim 4 wherein said sleeve is mounted upon said support member for axial movement with respect thereto between forward and rearward positions when said gripping surfaces are in said first position, said rearward position of said sleeve corresponding to said locked position of said locking member.

6. The adapter of claim 5 wherein said sleeve is substantially cylindrical in cross section.

7. The adapter of claim 6 wherein said sleeve is further movable rotationally between first and second angular orientations with respect to said support member when said sleeve is in said forward position.

8. The adapter of claim 2 wherein said gripping means comprise a pair of gripper members each carrying one of said gripping surfaces.

9. The adapter of claim 8 wherein said gripper members are mounted for pivotal movement to move said gripping surfaces between said first and second positions, and wherein movement of said locking member to said locked position when said gripping surfaces are in said first position prevents pivotal movement of said gripper members.

10. The adapter of claim 9 wherein at least a portion of said locking member closely surrounds at least portions of both of said gripper members when said gripping surfaces are in said first position and said locking member is in said locked position.

11. The adapter of claim 2 wherein said locking member is movable to and from said locked position in a direction parallel to said linear axis.

12. The adapter of claim 1 wherein said gripping means comprise a pair of gripper members mounted for pivotal movement relative to one another.

13. The adapter of claim 12 wherein said gripper members are mounted for independent pivotal movement about spaced, parallel axes.

14. The adapter of claim 13 wherein said parallel axes are perpendicular to said linear axis.

15. The adapter of claim 12 wherein said gripper members are pivotally connected to said support member.

16. The adapter of claim 1 and further including an axial ferrule fiber connector having a portion mounted in said second end of said passageway and extending outwardly therefrom coaxially with said linear axis.

17. The adapter of claim 16 and further including an engagement member contacting said portion of said connector to retain the latter within said second end of said passageway.

18. The adapter of claim 17 wherein said engagement member is a set screw.

19. A bare fiber adapter for positioning and holding the terminal end of an optical fiber in a predetermined position with respect to an axial ferrule, fiber optic connector, said adapter comprising:

a) means defining a first passageway having first and second ends for passage of an optical fiber;

b) gripping means including at least two gripping surfaces relatively movable between first and second positions wherein said surfaces are in mutually contacting and spatially separated positions, respectively;

c) means for mounting said gripping means adjacent said first end of said first passageway, whereby an optical fiber extending into said first end of said first passageway is engaged between said gripping surfaces-when the latter are in said first position; and d) means for interchangeably mounting any of a plurality of industry-standard styles of said connector in said second end of said first passageway to extend axially therefrom.

20. The adapter of claim 19 wherein said means defining said first passageway comprise a support member, and said gripping means comprise a pair of gripper members, each carrying one of said gripping surfaces.

21. The adapter of claim 20 and further including a locking member selectively movable to and from a locked position wherein said locking member prevents movement of said gripping surfaces away from said first position.

22. The adapter of claim 21 wherein said locking member comprises a hollow sleeve movable into and out of closely surrounding relation to at least portions of said gripper members.

23. The adapter of claim 20 wherein said gripper members are pivotally connected to said support member.

24. The adapter of claim 19 wherein said connector extends between opposite ends and includes a barrel portion at one end, a ferrule portion at the other end and a second, through passageway for passage of said fiber, and wherein said means for mounting said connector comprise an axial portion of said first passageway extending from said second toward said first end thereof for telescopingly receiving an axial portion of said barrel portion of said connector.

25. The adapter of claim 24 and further including means for releasably retaining said barrel portion is said second end of said first passageway.

26. The adapter of claim 19 wherein said plurality of styles include FC, SC and ST styles.

27. The adapter of claim 19 and further including means for releasably locking said gripping means to retain said gripping surfaces in said first position.

28. The method of positioning and releasably holding an end portion of an optical fiber in a first fixture having a first passageway with a first, linear axis for passage of said end portion and gripping means selectively movable into and out of engagement with said end portion to position the terminal end surface of said end portion in a first plane perpendicular to the axis of said first passageway, said method comprising:

a) providing a second fixture having a second passageway with a second linear axis;

b) positioning within said second passageway in a second plane perpendicular to said second axis a flat, polished abutment surface;

c) releasably connecting said second fixture to said first fixture with said first and second axes aligned and said first and second planes substantially coplanar;

d) moving said optical fiber axially through said first passageway with said gripping means out of engagement with said end portion until said terminal end surface abuts said abutment surface;

e) moving said gripping means into frictional engagement with said end portion;

f) releasably locking said gripping means in said frictional engagement position; and g) disconnecting said second fixture from said first fixture.

29. The method of claim 28 wherein said first fixture includes an axial ferrule fiber optic connector and said second fixture is connected to and disconnected from said connector.

30. The method of claim 29 wherein said first fixture includes an axial ferrule fiber optic connector and said second fixture is connected to and disconnected from said connector.

31. The method of claim 30 and including the further step of connecting a third fixture to said first fixture following disconnection of said second fixture.

32. The method of claim 31 wherein said third fixture provides means for releasably attaching a second axial ferrule fiber optic connector in axial alignment with the connector of said first fixture.

33. The method of claim 28 wherein said gripping means are moved manually into and out of engagement with said end portion of said fiber.

34. The method of claim 28 wherein said first fixture includes a locking member selectively movable between locking and unlocking positions and said step of releasably locking said gripping means comprises moving said locking member to said locking position.

* * * * *